United States Patent
Tegegne

(10) Patent No.: US 11,693,849 B2
(45) Date of Patent: Jul. 4, 2023

(54) CONSISTENT STRUCTURED DATA HASH VALUE GENERATION ACROSS FORMATS AND PLATFORMS

(71) Applicant: Dell Products L. P., Round Rock, TX (US)

(72) Inventor: Abel Tegegne, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 33 days.

(21) Appl. No.: 16/690,771

(22) Filed: Nov. 21, 2019

(65) Prior Publication Data

US 2021/0157802 A1     May 27, 2021

(51) Int. Cl.
  *G06F 7/00*          (2006.01)
  *G06F 16/242*        (2019.01)
  *G06F 16/2457*       (2019.01)
  *G06F 16/22*         (2019.01)

(52) U.S. Cl.
  CPC ........ *G06F 16/244* (2019.01); *G06F 16/2255* (2019.01); *G06F 16/24573* (2019.01)

(58) Field of Classification Search
  CPC .... G06F 16/182; G06F 16/178; G06F 16/113; G06F 16/244; G06F 16/24573; G06F 16/2255
  USPC ................ 707/690, 691, 737, 741, 756, 812
  See application file for complete search history.

(56) References Cited

U.S. PATENT DOCUMENTS

| | | | |
|---|---|---|---|
| 7,886,068 B1* | 2/2011 | Rao ........................ | H04L 67/14 709/231 |
| 2007/0130263 A1* | 6/2007 | Li ........................ | G06Q 10/107 709/206 |
| 2016/0350301 A1* | 12/2016 | Tripathy ................ | G06F 40/205 |
| 2017/0272250 A1* | 9/2017 | Kaliski, Jr. ............. | H04L 9/006 |
| 2020/0286112 A1* | 9/2020 | Zhou ....................... | G06N 20/00 |
| 2020/0311049 A1* | 10/2020 | Alagumuthu ....... | G06F 16/2365 |

\* cited by examiner

*Primary Examiner* — Md I Uddin
(74) *Attorney, Agent, or Firm* — Krishnendu Gupta; Deepika Bhayana; Derek Lam

(57) ABSTRACT

Methods, information handling systems and computer readable media are disclosed for generation of consistent structured data hash values across platforms and structured data formats. In one embodiment, a method includes identifying, at an information handling system, a set of data segments within a set of structured data and expressing the set of structured data in a standard format. This embodiment of the method further includes, for each of the data segments within the set of data segments, applying a hash algorithm to produce a data segment hash value and obtaining a standardized identifier for the data segment. The method continues with assembling an aggregate hash code comprising the standardized identifier and the data segment hash value for each of the data segments, and confirming an association of the aggregate hash code with the set of structured data.

11 Claims, 5 Drawing Sheets

CONSISTENT STRUCTURED DATA HASH VALUE GENERATION ACROSS FORMATS AND PLATFORMS

The present disclosure relates to improving the operation of information handling systems, and more particularly to generation of a consistent hash code, across platforms and data formats, for a given set of structured data.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a networked group of information handling systems, software modules or applications running on different systems may interact with one another and share data. A large commercial enterprise, for example, may have networked systems running applications for multiple interrelated functions, such as order management, order fulfillment, manufacturing, shipping and customer support. Data shared between such networked information handling systems is often structured data organized into specific fields. Multiple structured data formats are in common use, such as JavaScript Object Notation (JSON), Extensible Markup Language (XML) and comma separated values (CSV), to name a few. The same data can therefore be represented in multiple ways, and interacting applications or modules may use different data formats.

In working with structured data, an application running on an information handling system may need to perform data evaluation operations such as determining whether a particular structured document or set of structured data has changed or assessing a degree of similarity between two documents or sets of structured data. Such data storage and retrieval operations can be performed more efficiently by employing hash functions or algorithms to map data sets to fixed-length hash codes or hash values. Comparing a current hash value to a previously obtained hash value for the same document can determine whether the document has changed, for example. Representation of the same data in a different structured data format results in a different hash value, so that a document appears to have changed when the substance of the data is the same. Such "false positives" cause unnecessary computational activity such as cache or memory updates and notifications to other systems. This can reduce the speed and efficiency of individual information handling systems as well as an overall network of interacting systems, and can increase resource requirements, such as power and bandwidth requirements, for the systems and network.

SUMMARY

Methods, information handling systems and computer readable media are disclosed for generation of consistent structured data hash values across platforms and structured data formats. In one embodiment, a method includes identifying, at an information handling system, a set of data segments within a set of structured data and expressing the set of structured data in a standard format. This embodiment of the method further includes, for each of the data segments within the set of data segments, applying a hash algorithm to produce a data segment hash value and obtaining a standardized identifier for the data segment. The method continues with assembling an aggregate hash code comprising the standardized identifier and the data segment hash value for each of the data segments, and confirming an association of the aggregate hash code with the set of structured data.

The foregoing is a summary and thus contains, by necessity, simplifications, generalizations and omission of detail; consequently those skilled in the art will appreciate that the summary is illustrative only and is not intended to be in any way limiting.

BRIEF DESCRIPTION OF THE DRAWINGS

Embodiments of methods and systems such as those disclosed herein may be better understood, and their numerous objects, features, and advantages made apparent to those skilled in the art by reference to the accompanying drawings. For ease of discussion, the same reference numbers in different figures may be used to indicate similar or identical items.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

Figure 1:
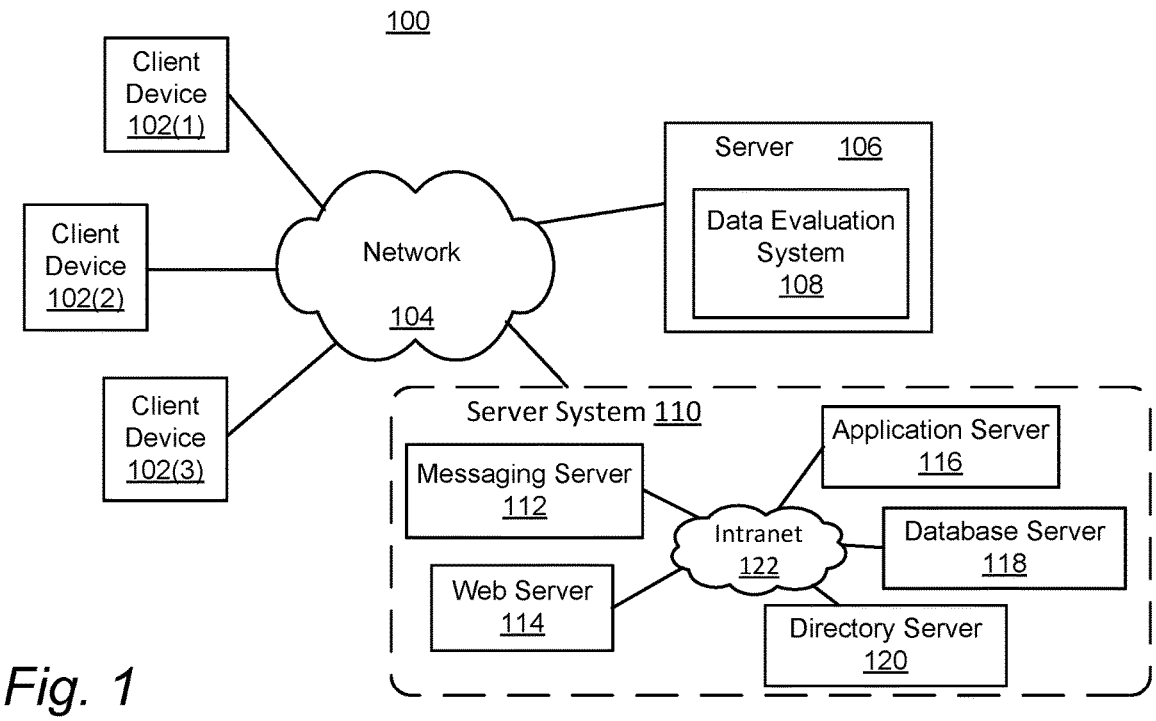
FIG. 1 is a simplified block diagram illustrating an example of a network environment including multiple information handling systems, and suitable for implementing aspects of an embodiment of the present disclosure.

A network environment 100 including multiple networked information handling systems is shown in FIG. 1. In the embodiment of FIG. 1, client computing devices 102(1)-(3), server computing device 106 including data evaluation system 108, and server system 110 are communicatively coupled to one another via network 104. Client computing devices 102(1)-(3) and server 106 are embodiments of information handling systems as described above and elsewhere herein, and may take any of the various forms described, including personal computers, tablet computers, smartphones, or servers, as appropriate.

As noted above, an information handling system may include an aggregate of instrumentalities. For example, as used in this disclosure, "server" may include a server system such as server system 110, where a server system includes multiple networked servers configured for specific functions. As an example, server system 110 includes a messaging server 112, web server 114, application server 116, database server 118 and directory server 120, interconnected with one another via an intranet 122. Network 104 includes one or more networks suitable for data transmission, which may include local area networks (LANs), wide area networks (WANs), storage area networks (SANs), the Internet, or combinations of these. In an embodiment, network 104 includes a publicly accessible network, such as a public switched telephone network (PSTN), a DSL connection, a cable modem connection or large bandwidth trunks (e.g., communications channels providing T1 or OC3 service). Such networks may also include cellular or mobile telephone networks and other wireless networks such as those compliant with the IEEE 802.11 standards. Intranet 122 is similar to network 104 except for being, typically, private to the enterprise operating server system 110.

Each of the information handling systems illustrated in FIG. 1 executes application programs (not shown), which may include applications local to that information handling system or distributed across multiple information handling systems. Applications, modules or "services" in a services-based or microservices-based architecture executing on different information handling systems within network 100 can interact with one another and provide data to one another. Such interacting applications, modules or services may use different structured data formats.

Figure 2:
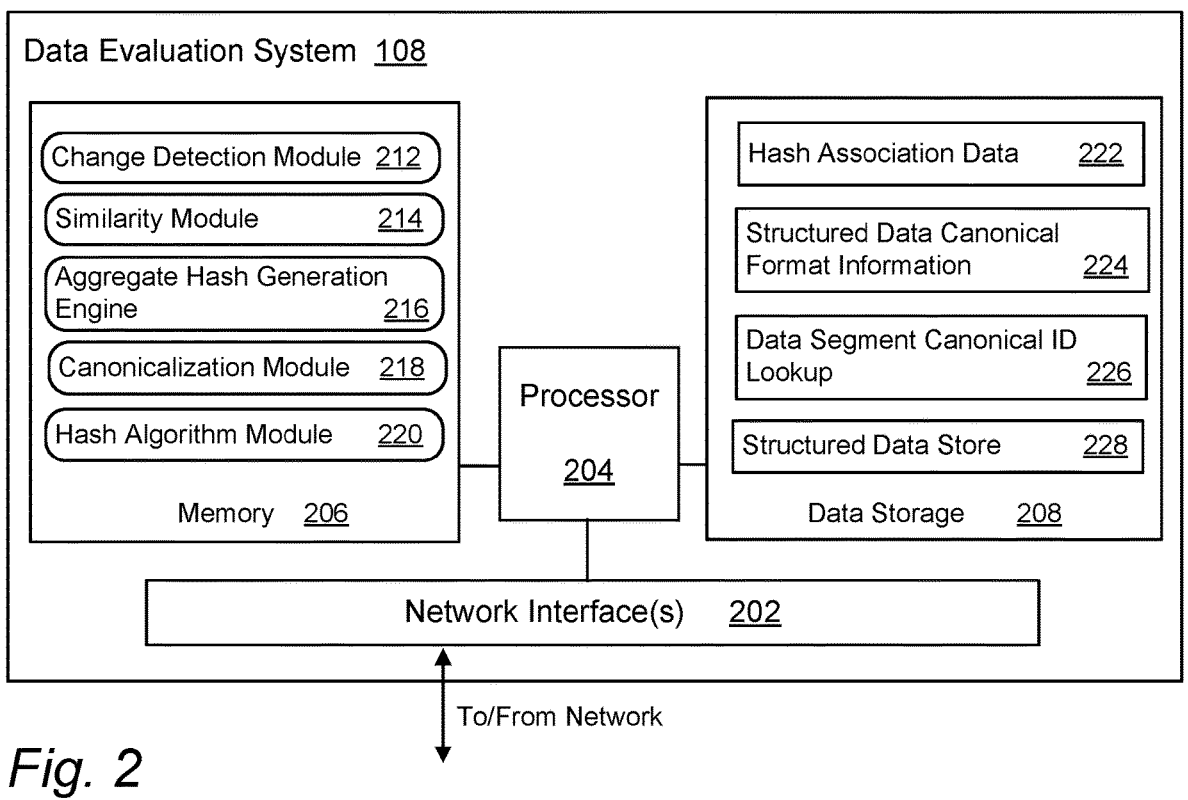
FIG. 2 is a simplified block diagram illustrating certain components of an embodiment a data evaluation system implemented on an information handling system, in accordance with an embodiment of the present disclosure.

A block diagram illustrating certain components of a data evaluation system 108 is shown in FIG. 2. Although shown in FIG. 1 as implemented on a server 106, embodiments of data evaluation system 108 can be implemented on any of the information handling systems shown in FIG. 1, such as a client device 102, a server system 110 or one of the servers within system 110. In some embodiments, data evaluation system 108 is implemented as part of a device primarily dedicated to data management, such as a database server managing a particular structured data store, a messaging server managing data requests between interacting applications on different devices, or a controller for a network of "smart" devices in a system such as the Internet of Things (IoT). Data evaluation system 108 may also be implemented for data evaluation needed on a device implementing other functions.

In the embodiment of FIG. 2, data evaluation system 108 includes one or more network interfaces 202, a processor 204, memory 206 and data storage 208. Memory 206 stores program instructions that when executed by processor 204 implement a change detection module 212, a similarity module 214, an aggregate hash generation engine 216, a canonicalization module 218, and a hash algorithm module 220. Data storage 208 is configured to store hash association data 222, structured data canonical format information 224, data segment canonical identifier (ID) lookup 226, and structured data store 228.

Network interface 202 is configured for both sending and receiving of data and control information within a network. In an embodiment, network interface 202 comprises multiple interfaces and can accommodate multiple communications protocols and control protocols. Memory 206 includes a plurality of memory locations addressable by processor 204 for storing program instructions and data used in program execution. As such, memory 206 may be implemented using any combination of volatile or non-volatile memory, including random-access memory (RAM) and read-only memory (ROM). In an embodiment, memory 206 is system memory for processor 204. Data storage 208 includes one or more integrated or peripheral mass storage devices, such as magnetic disks, optical disks, solid state drives or flash drives. In other embodiments, or at other times during operation of the embodiment of FIG. 2, some or all of the instructions shown in memory 206 may be stored in data storage 208, and some or all of the data shown in data storage 208 may be stored in memory 206.

Change detection module 212 is configured to detect a change in a set of structured data using a hash code associated with the set of structured data. In an embodiment, the hash code is an aggregate hash code such as that generated by aggregate hash generation engine 216, or a hash code derived from such an aggregate hash code by applying a hashing algorithm to the aggregate hash code. An embodiment of a method carried out by change detection module 212 is described below in connection with FIG. 5. Similarity module 214 is configured to assess a degree of similarity between two sets of structured data, using aggregate hash codes associated with each of the sets of structured data. An embodiment of a method carried out by similarity module 214 is described below in connection with FIG. 6.

Aggregate hash generation engine 216 is configured to generate an aggregate hash code for a set of structured data. The aggregate hash code is believed to provide improved consistency across platforms and data formats as compared to fixed-length hash codes generated by applying traditional hashing algorithms. An embodiment of a method carried out by aggregate hash generation engine 216 is described below in connection with FIG. 3. An illustration of components of an aggregate hash code is shown in FIG. 4. In various embodiments, aggregate hash generation engine 216 is invoked by change detection module 212 or similarity module 214. Canonicalization module 218 is configured to express a set of structured data in a canonical, or standard, format. In an embodiment, module 218 is invoked by aggregate hash generation engine 216. Hash algorithm module 220 is configured to generate a traditional fixed-length hash value by applying a hash algorithm to a data string. In various embodiments, module 220 is invoked by aggregate hash generation engine 216, change detection module 212 or similarity module 214.

In the embodiment of FIG. 2, data evaluation system 108 includes modules for change detection and similarity assessment of sets of structured data. In other embodiments, a data evaluation system is configured to implement only one rather than both of these operations. In still other embodiments, a data evaluation system is configured to perform one or more different data evaluation functions using an aggregate hash value (or other hash value derived from an aggregate hash value).

Hash association data 222 is a data structure storing a correspondence between a data string, such as a string encoding a set of structured data, and a hash code, or hash value, representing the data string. Hash association data 222 may also be referred to as a hash value dictionary herein. In an embodiment, an entry in association data 222 includes an identifier of the data string represented by a hash code and a type of the data string, in addition to the hash code. When the data string is a document, for example, such an entry would include a document identifier, document type and hash code for the document. In some embodiments, hash association data 222 is implemented as multiple tables or other data structures. In an embodiment, hash association data 222 relates aggregate hash codes, as described further below in connection with FIGS. 3 and 4, to corresponding data strings or sets of structured data. In another embodiment, hash association data 222 includes fixed-length hash codes derived from aggregate hash codes. Hash association data 222 may also store a correspondence between data segments within a set of structured data and fixed-length hash codes resulting from applying a hashing algorithm to the respective data segments. Such fixed-length hash codes for data segments are embedded in an aggregate hash code for a set of structured data containing the data segments, as described further below. Some or all of the above-described hash code types are included in various embodiments of hash association data 222.

Structured data canonical format information 224 includes information used in expressing a set of structured data in a canonical, or standard, format. In an embodiment, information 224 is in the form of a data structure relating particular types of structured data to the standard format for expressing that type of data. In a further embodiment, information 224 also includes one or more non-standard formats that may be used in expressing a particular type of data, to be used in recognizing non-standard forms and converting to standard forms. Data segment canonical ID lookup 226 is a data structure relating specific data segments within a set of structured data to canonical, or standardized, identifiers for those segments. In an embodiment, the canonical identifiers have any suitable length or format that allows the identified data segments to be ordered in a reproducible sequence. In an embodiment, lookup 226 includes rules or formulas for generating the canonical identifiers. Structured data store 228 includes the structured data corresponding to the hash codes in hash association data 222. In an embodiment, structured data store 228 is in the form of a database. In an embodiment, canonical format information 224 and data segment canonical ID information in lookup 226 are shared between networked information handling systems hosting interacting applications, so that all of the systems generate the same aggregate hash codes from a given data string.

Further alternatives and variations will be apparent to one of ordinary skill in the art in view of this disclosure. For example, some or all of the modules depicted within memory 206 may be implemented using separate servers as part of a server system like system 110 of FIG. 1. Data depicted within data storage 208 may also be associated with one or more separate servers. Software modules and engines described herein may take various forms understood to one of ordinary skill in the art in view of this disclosure. A single module or engine described herein may in some embodiments be implemented by a combination of multiple files or programs. Alternatively or in addition, one or more functions associated with modules or engines delineated separately herein may be combined into a single file or program. For example, the hash value correspondences of hash association data 222 may be combined with structured data store 228 in some embodiments. As another example, structured data canonical format information 224 may be combined with data segment canonical ID lookup 226 in some embodiments.

For ease of discussion, a device or module may be referred to as, for example, "performing," "accomplishing," or "carrying out" a function or process. The unit may be implemented in hardware and/or software. However, as will be evident to one skilled in the art, such performance can be technically accomplished by one or more hardware processors, software, or other program code executed by the processor, as may be appropriate to the given implementation. The program execution could, in such implementations, thus cause the processor to perform the tasks or steps instructed by the software to accomplish the desired functionality or result. However, for the sake of convenience, in the discussion below, a processor or software component may be interchangeably considered as an "actor" performing the task or action described, without elaborating the underlying software execution mechanism.

An illustration of an example of using different formats for representing structured data is provided in Table 1.

TABLE 1

| Format # | Representation |
|---|---|
| 1 | <Address>1 Dell Way, Round Rock, TX 78682</Address> |
| 2 | <Address><br>  <StreetNumber>1</StreetNumber><br>  <StreetName>Dell Way</StreetName><br>  <City>Round Rock</City><br>  <ZipCode>78682</ZipCode><br>  <State>Texas</State><br></Address> |
| 3 | <Address><br>  <StreetNumber>1</StreetNumber><br>  <StreetName>Dell Way</StreetName><br>  <City>Round Rock</City><br>  <County>Williamson</County><br>  <ZipCode>78682-7000</ZipCode><br>  <State>TX</State><br></Address> |
| 4 | Street,City,Zip,State<br>1 Dell Way,Round Rock,78682,Texas |
| 5 | { |

TABLE 1-continued

| Format # | Representation |
|---|---|
| | "StreetNumber": 1,<br>"StreetName": "Dell Way",<br>"City": "Round Rock",<br>"Zip": 78682,<br>"State": "Texas"<br>} |

In the embodiment of Table 1, an address is shown in five different formats. Format 1 uses Address tags at each end of the address data, but does not include tags for specific elements of the address. Format 1 also arranges the address elements in a different order than the other formats, with the ZIP code listed after the state. Format 2 uses StreetNumber, StreetName, City, ZipCode and State tags in addition to Address tags, with each of the address elements positioned on a separate line. The full word of the state is used for the state value in Formats 2, 4 and 5, while Format 1 and Format 3 use the two-letter postal abbreviation for the state. Format 3 has similar tags and line arrangement to Format 2, but Format 3 includes additional information not appearing in the other formats: the county name and an extra four digits in the ZIP code. Format 4 does not include Address tags, and includes names for the address elements separated by commas on one line, with corresponding values of the address elements separated by commas on the next line. Format 5 does not include Address tags, but includes brackets around the set of address elements. Each address element is positioned on a separate line, with commas between the elements. Non-numeric names and values are surrounded by quotation marks, with names of address elements separated from corresponding values by a colon. Application of a hashing algorithm to each of the address representations of Table 1 will typically result in a variety of different hash values, even though the same address is represented each time. The example of Table 1 is further referenced in the descriptions of FIGS. 3 and 4 below.

Figure 3:
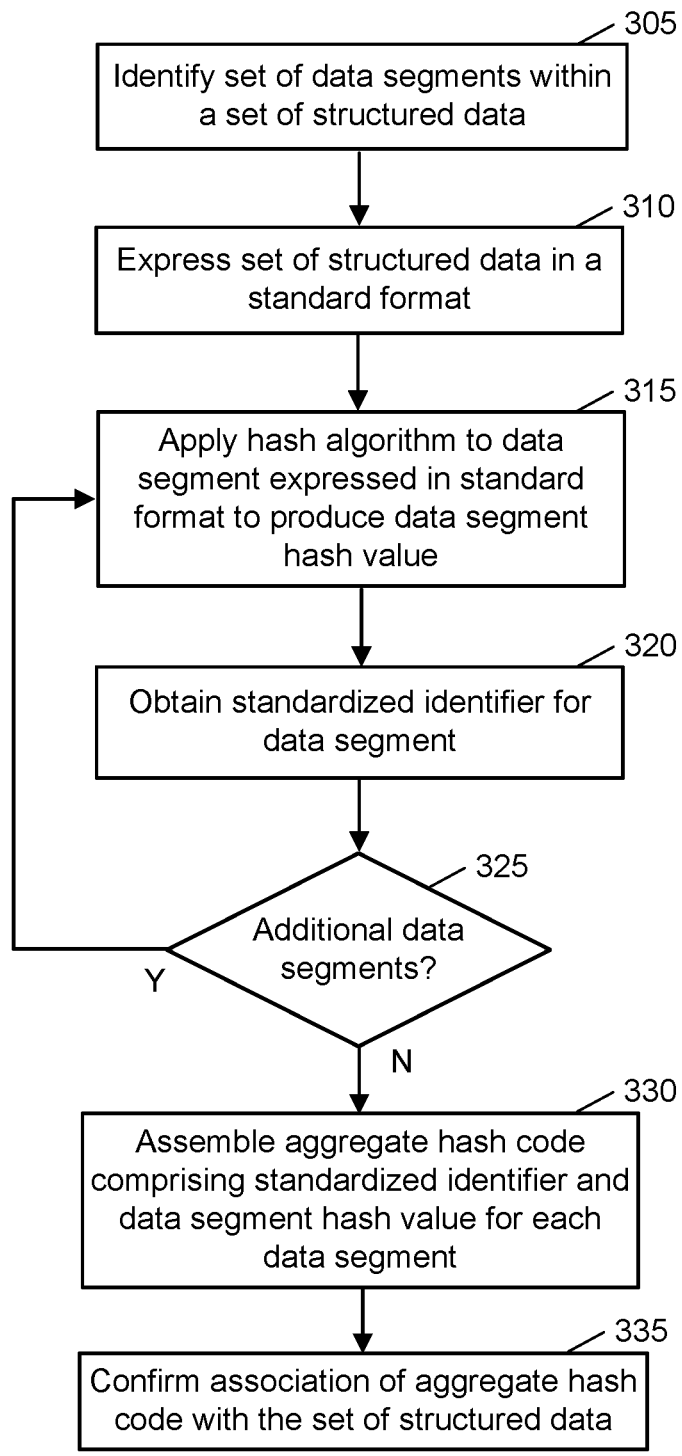
FIG. 3 is a flow chart illustrating certain aspects of an embodiment of a method for generating an aggregate hash code, in accordance with an embodiment of the present disclosure.
Figure 4:
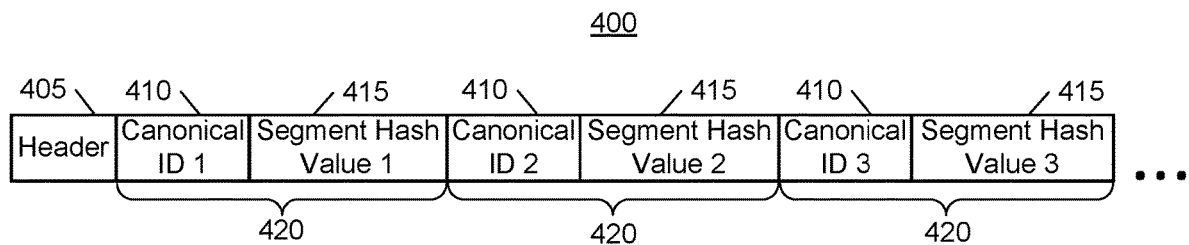
FIG. 4 illustrates components of an embodiment of an aggregate hash code, in accordance with an embodiment of the present disclosure.

A flow chart illustrating an embodiment of a method for generating an aggregate hash code is shown in FIG. 3. Method 300 of FIG. 3 is an embodiment of a method performed by an aggregate hash generation engine such as engine 216 of FIG. 2. The method begins in step 305 with identifying a set of data segments within a set of structured data. In an embodiment, a set of structured data is a document including structured data. With reference to Table 1, the represented address data is an example of a set of structured data, particularly when using data formats having elements within the address tagged separately. Each of the elements within the address represented in Table 1 can be designated as a data segment within the set of structured data. Using Format 5 of Table 1, for example, one data segment could be the data string "StreetNumber":1 and each of the other lines of data could be a data segment as well. Alternatively, the entire address represented in Table 1 could be designated as a data segment.

In an embodiment, data segments are designated by an administrator based on the smallest data element for which there is interest in separately considering in a change detection or other data evaluation method. In such an embodiment, this designation is reflected in a data structure such as data segment canonical ID lookup 226, so that identifying the set of data segments includes accessing this data structure. In another embodiment, data segments of interest are identified by a user of an application program implementing a data evaluation operation such as change detection (through a user interface of the application program, for example), which in turn provides the data segment identification to the aggregate hash generation module. Depending on the size of a set of structured data and the level of granularity needed for data evaluation, the set of data segments within the set of structured data can in some embodiments include only a single data segment.

Method 300 also includes, in step 310, expressing the set of structured data in a standard format. In an embodiment, the standard format is identified by structured data canonical format information such as information 224 of FIG. 2. With reference to the example of Table 1, in an embodiment for which Format 5 is the data format to be used as the standard data format, address data will be expressed in that format. If a set of structured data includes an address expressed in Format 3, for example, operation of step 310 would convert that address to be expressed in Format 5. In addition to a standard data format, the expression in a standard format of step 310 includes, in some embodiments, "cleanup" processes such as removing extraneous spaces and line breaks. In such an embodiment, expression of the address of Table 1 in a standard format using Format 5 could produce a data string like the following:

{"StreetNumber": 1, "StreetName": "Dell Way", "City": "Round Rock", "Zip": 78682, "State": "Texas" }

In step 315 of method 300, a hash algorithm is applied to a first data segment in the set of data segments, after the data segment has been expressed in the standard format, to produce a data segment hash value. This hash value for the data segment is a traditional fixed-length hash value, obtained using a suitable hashing algorithm, as will be understood by one of ordinary skill in the art of data storage and retrieval in view of this disclosure. Examples of possible hash algorithms include the Secure Hash Algorithm (SHA) standard algorithms such as SHA-1 and SHA-224, the Message Digest (MD) algorithms such as MD5 and MD6-256, and the Whirlpool algorithm, but many others exist. In an embodiment, application of the hash algorithm is carried out by invoking a hash algorithm module such as module 220 of FIG. 2. In step 320, a standardized identifier for the data segment is obtained. In an embodiment, the identifier is obtained with reference to a data structure such as data segment canonical ID lookup 226 of FIG. 2. Steps 315 and 320 are repeated for each of the data segments within the set of structured data (decision step 325).

Method 300 further includes, in step 330, assembling an aggregate hash code including the standardized identifier and data segment hash value for each of the data segments. An illustration of an embodiment of an assembled aggregate hash code is shown in FIG. 4. In the embodiment of FIG. 4, aggregate hash code 400 includes an optional header 405. Header 405 allows for inclusion of additional information if desirable, such as information regarding an application program using aggregate hash code 400 or a source and/or destination of the set of structured data. Canonical identifiers 410 represent the standardized data segment identifiers obtained in step 320 of FIG. 3, and segment hash values 415 represent the fixed-length hash values produced for each data segment in step 315 of FIG. 3. Each ID-hash pair 420 in aggregate hash code 400 is associated with a single data segment within the set of structured data. In an embodiment, the aggregate hash code assembly of step 330 includes arranging the ID-hash pairs 420 in a specific order based on values of canonical identifiers 410. In another embodiment, ordering of the data segments corresponding to segment hash values 415 is established in step 310, when the structured data is expressed in a standard format. The ellipsis at the right side of FIG. 4 indicates that aggregate hash code 400 extends farther to the right, depending on the number of data segments included in the set of structured data. The length of the aggregate hash code therefore varies. If a fixed-length hash code is needed, a hash algorithm can be applied to aggregate hash code 400 to generate a fixed-length hash value.

Returning to FIG. 3, method 300 ends at step 335 with confirming an association of the aggregate hash code with the set of structured data. In an embodiment, confirming the association is done by storing the aggregate hash code in a data structure relating the aggregate hash code to the set of structured data, such as hash association data 222 of FIG. 2. In an embodiment, hash association data 222 contains the set of structured data itself. Alternatively, the set of structured data is stored elsewhere, and hash association data 222 contains an identifier of or pointer to the set of structured data. The hash code could also be stored in a structured data store such as data store 228 in a way that relates the hash code to the set of structured data. An example of another way of confirming an association of the aggregate hash code to the set of structured data is by checking a data structure, such as hash association data 222 or structured data store 228, and finding that the aggregate hash code is already stored in a way relating the aggregate hash code to the set of structured data. This situation can arise if a set of structured data is unchanged from a previous version of the same set of data. Another example of a way of confirming an association of the aggregate hash code to the set of structured data is by sending the aggregate hash code along with the set of structured data to a different information handling system.

The aggregate hash code generation method of FIG. 3 and aggregate hash code structure of FIG. 4 are believed to provide for consistent hash code generation across data formats and platforms, leading to fewer erroneous findings that data has changed. The aggregate hash code also allows specific data segments or groups of data segments to be selected for data evaluation operations, reducing data change findings caused by changes to unimportant data. These reductions in data change findings will in turn cause a reduction in unnecessary cache updates and notifications, improving the speed and efficiency of computer systems and networks.

Figure 5:
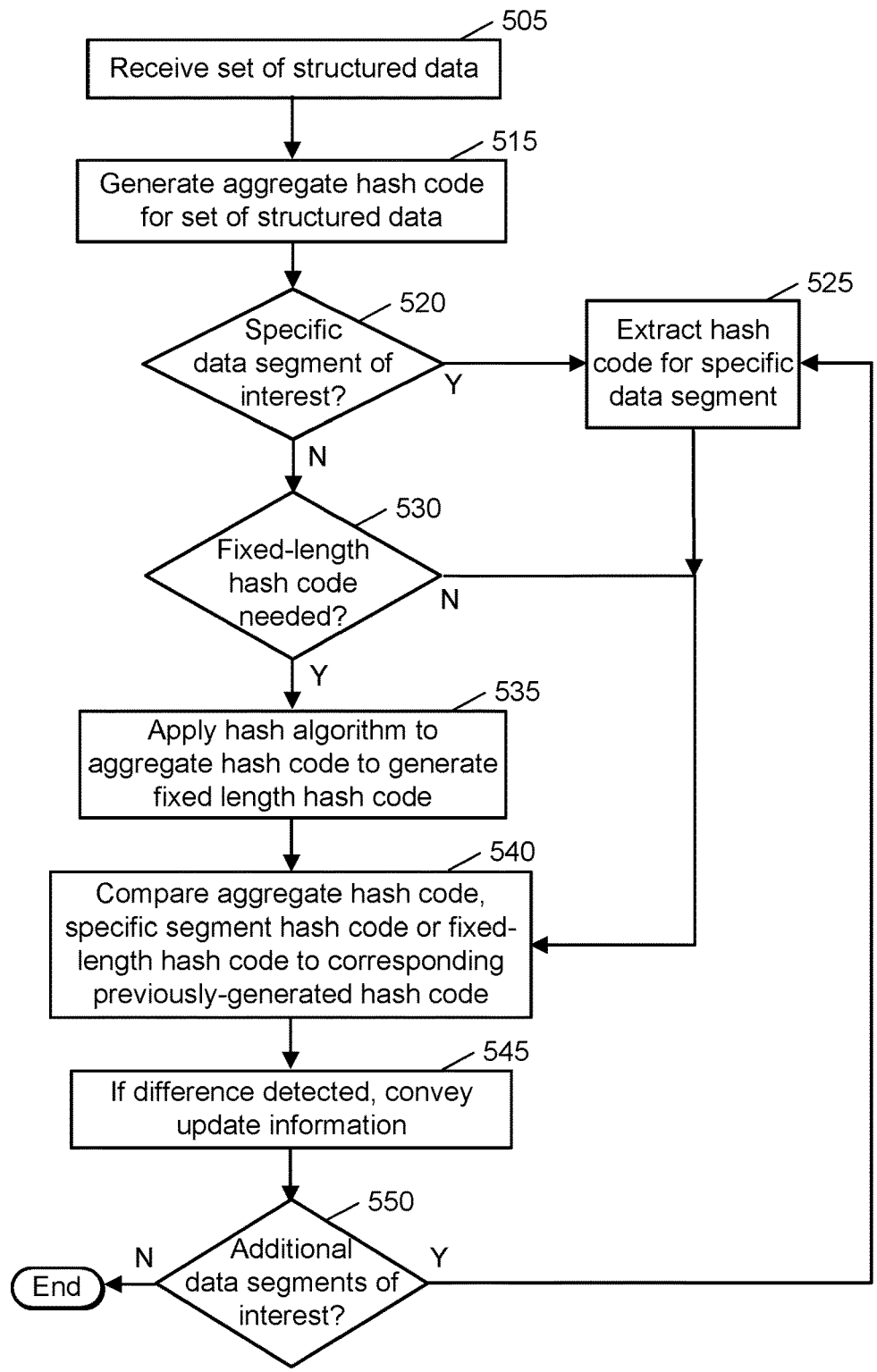
FIG. 5 is a flow chart illustrating certain aspects of an embodiment of a method for change detection in structured data using an aggregate hash code, in accordance with an embodiment of the present disclosure.

A flow chart illustrating an embodiment of a method for change detection of structured data using an aggregate hash code is shown in FIG. 5. In an embodiment, method 500 of FIG. 5 is carried out by a change detection module such as module 212 in FIG. 2. Method 500 begins at step 505 with receiving a set of structured data, such as a document, data from an online form, a database record, or any other set of structured data. An aggregate hash code having the general form of hash code 400 of FIG. 4 is generated for the set of structured data at step 515. In an embodiment, the aggregate hash code generation of step 515 is done using method 300 of FIG. 3, as described above. If a specific data segment within the set of structured data is of interest for identification ("Y" branch of decision step 520), the fixed-length hash code for that data segment is extracted from the aggregate hash code (step 525). This data segment hash code corresponds to one of the data segment hash values 415 in aggregate hash code 400 of FIG. 4. This data segment hash code is then compared, in step 540, to a previously-generated hash code for the same data segment. If a difference is detected (if the compared hash codes are different), update information is conveyed in step 645. In an embodiment, conveying update information is done by storing the updated hash code in a data structure relating the hash code to the data segment. In another embodiment, conveying update information includes storing the data segment itself in a data structure such as structured data store 228. In still another embodiment, conveying the update information includes sending a notification of the data change to an application, module, service or system for which the data segment is relevant. In such an embodiment, sending a notification of the data change may include sending the updated data segment itself. If additional data segments are of interest for identification ("Y" branch of decision step 550), steps 525, 540 and 545 are repeated for the next segment, until there are no more data segments of interest.

Returning to decision step 520, if a specific data segment is not selected ("N" branch) and a fixed-length hash code is not needed ("N" branch of decision step 530), the full aggregate hash code generated in step 515 is compared, at step 540, to a previously-generated aggregate hash code for the set of structured data. If a difference is detected, update information is conveyed in step 545, in ways similar to those described above for updating of a data segment. If a fixed-length hash code is desired or needed ("Y" branch of decision step 530), a hashing algorithm is applied, at step 535, to the aggregate hash code to generate a fixed-length hash code. This fixed-length hash code, derived from the aggregate hash code, is compared, in step 540, to a previously-generated aggregate hash code for the set of structured data. If a difference is detected, update information is conveyed in step 545, as described further above. Use of the full aggregate hash code, or a fixed-length hash code derived from the full aggregate hash code, for change detection is a way of determining whether there has been some change to the full set of structured data. This type of generalized change determination for a full document may be referred to as "change identification."

In embodiments for which the full aggregate hash code is used for comparison in step 540, decision step 550 may result in a "no" decision, in that no additional data segments are of interest when no specific data segment was of interest in decision step 520. In some embodiments, however, detection of a change in the full set of structured data triggers follow-up comparisons of hash codes for specific data segments, in order to "drill down" to specific data segments causing a change detection. In such embodiments, difference detection in step 545 is followed by the "yes" branch of decision step 550.

Although not depicted in method 500 of FIG. 5, in some embodiments an aggregate hash code, or a fixed-length code derived from an aggregate hash code, may accompany the received set of structured data if the aggregate hash code is generated at a system sending the set of structured data. In such an embodiment, the received hash code can be used in a change detection method in the same manner as shown in FIG. 5 for an aggregate hash code generated in step 515, or for a fixed-length hash code resulting from step 535, as appropriate.

Figure 6:
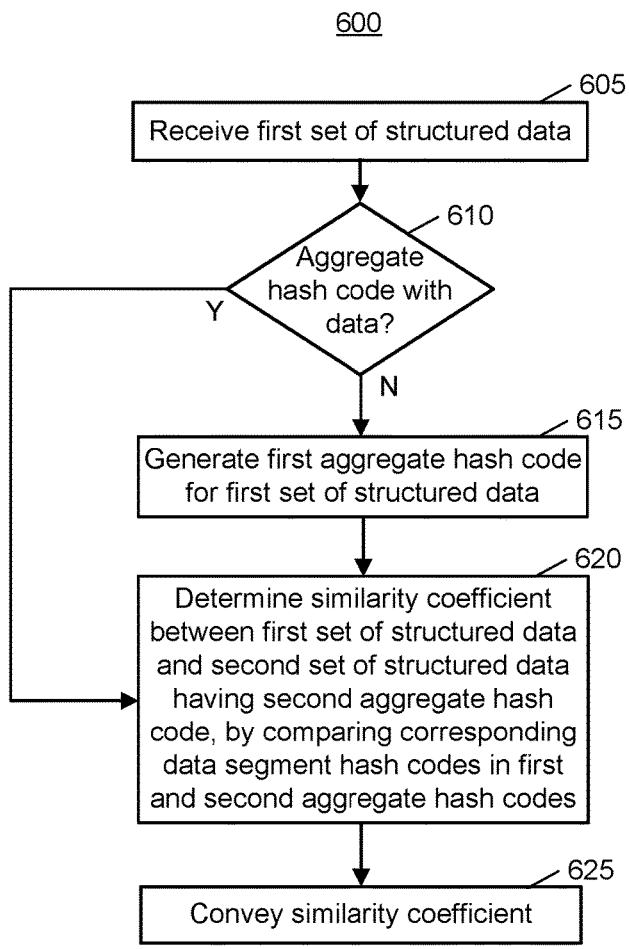
FIG. 6 is a flow chart illustrating certain aspects of an embodiment of a method for generating a similarity coefficient for structured data using an aggregate hash code, in accordance with an embodiment of the present disclosure.

A flow chart illustrating an embodiment of a method for generating a similarity coefficient for structured data using aggregate hash codes is shown in FIG. 6. In an embodiment, method 600 of FIG. 6 is performed by a similarity module such as module 214 of FIG. 2. Method 600 begins in step 605 with receiving a first set of structured data. If no hash code is received with the data ("N" branch of decision step 610), a first aggregate hash code having the general form of hash code 400 of FIG. 4 is generated for the first set of structured data (step 615). In an embodiment, the aggregate hash code generation of step 615 is done using method 300 of FIG. 3, as described above. When the first aggregate hash code is generated (or if the first aggregate hash code is received with the first set of structured data), a similarity coefficient can be determined, in step 620, between the first set of structured data and a second set of structured data having a second aggregate hash code. In the embodiment of FIG. 6, determining the similarity coefficient includes comparing corresponding data segment hash codes within the first and second aggregate hash codes. As will be understood by one of ordinary skill in the art of data evaluation, multiple similarity metrics can be used to determine a similarity coefficient between data sets. Examples of possible metrics include the simple matching coefficient (SMC) and the Jaccard index. Method 600 ends with conveying the similarity coefficient (step 625), where conveying the coefficient can include, for example, conveying the coefficient to a storage location at the information handling system performing method 600 or conveying the similarity coefficient to an application, module, service or system requesting the similarity coefficient.

Further modifications, alternatives and variations to the methods described herein will be apparent to one of ordinary skill in the art in view of this disclosure. Although steps of the flow charts presented herein are shown in sequential order, certain steps may be performed in a different order, or simultaneously, in other embodiments. As an example, steps 305 and 310 of FIG. 3 could be performed in opposite order in another embodiment.

Figure 7:
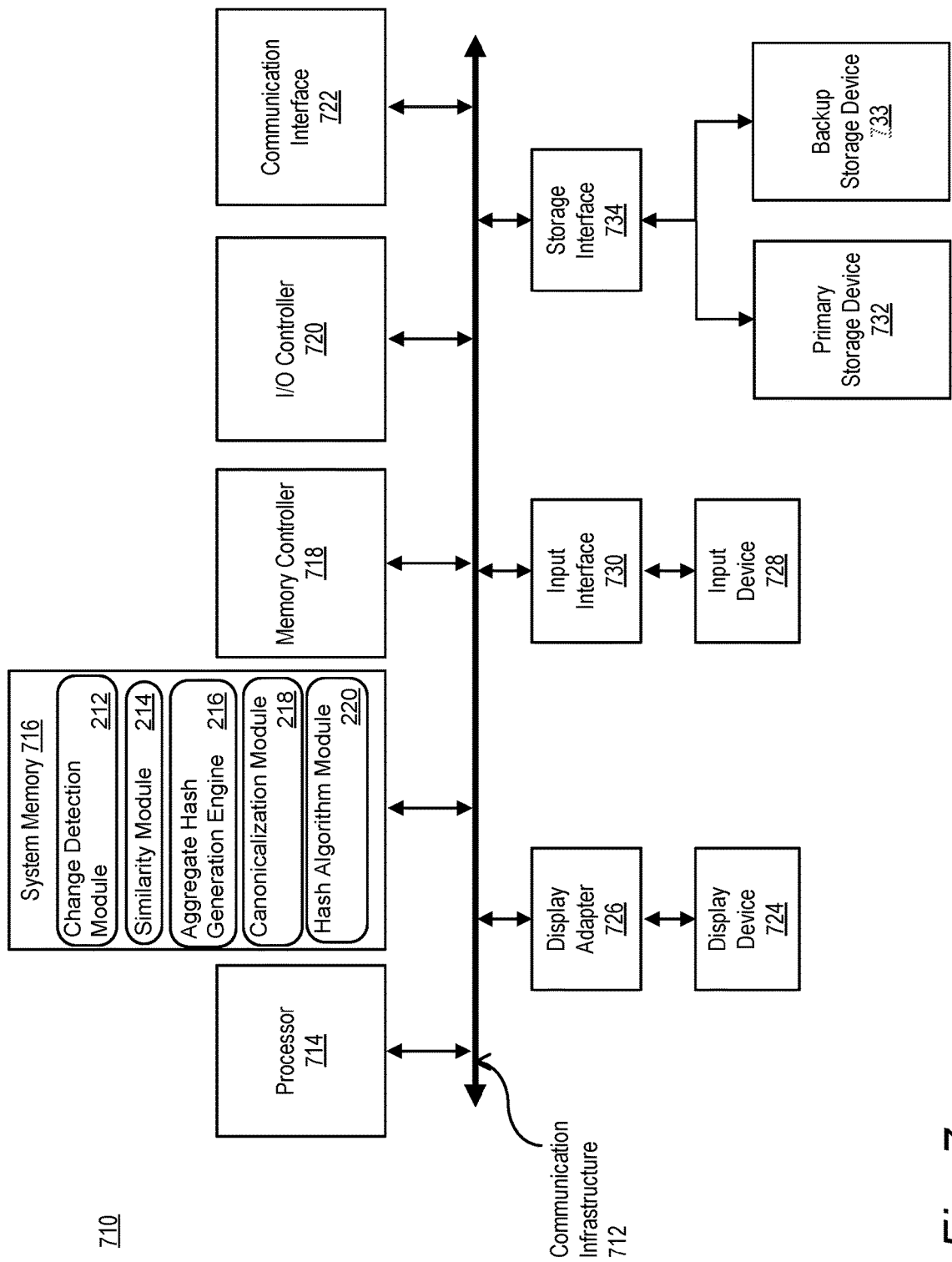
FIG. 7 is a block diagram illustrating an information handling system suitable for implementing aspects of an embodiment of the present disclosure.

FIG. 7 depicts a block diagram of an information handling system 710 suitable for implementing aspects of the systems described herein. In the embodiment of FIG. 7, computing system 710 implements data evaluation system 108. Embodiments of the computing system of FIG. 7 can, alternatively or in addition, implement various other engines and modules described in this disclosure. Computing system 710 broadly represents any single or multi-processor computing device or system capable of executing computer-readable instructions. Examples of computing system 710 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 710 may include at least one processor 714 and a system memory 716. By executing the software that implements fragmentation detection and repair system 108, computing system 710 becomes a special purpose computing device that is configured to perform database fragmentation detection and repair in manners described elsewhere in this disclosure.

Processor 714 generally represents any type or form of processing unit capable of processing data or interpreting and executing instructions. In certain embodiments, processor 714 may receive instructions from a software application or module. These instructions may cause processor 714 to perform the functions of one or more of the embodiments described and/or illustrated herein. System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. The ROM or flash memory can contain, among other code, the Basic Input-Output System (BIOS) which controls basic hardware operation such as the interaction with peripheral components. Although not required, in certain embodiments computing system 710 may include both a volatile memory unit (such as, for example, system memory 716) and a non-volatile storage device (such as, for example, primary storage device 732, as described further below). In one example, program instructions executable to implement a change detection module 212, similarity module 214, aggregate hash generation engine 216, canonicalization module 218 and hash algorithm module 220 may be loaded into system memory 716.

In certain embodiments, computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the operations or features described and/or illustrated herein. I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer) for display on display device 724. Computing system 710 may also include at least one input device 728 coupled to communication infrastructure 712 via an input interface 730. Input device 728 generally represents any type or form of input device capable of providing input, either computer or human generated, to computing system 710. Examples of input device 728 include, without limitation, a keyboard, a pointing device, a speech recognition device, or any other input device.

As illustrated in FIG. 7, computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may include a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710. A storage device like primary storage device 732 can store information such as routing tables and forwarding tables.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may be a part of computing system 710 or may in some embodiments be separate devices accessed through other interface systems. Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7.

Computing system 710 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 710 for storage in memory via a network such as the Internet or upon a carrier medium. The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the embodiments described and/or illustrated herein. Additionally or alternatively, one or more of the embodiments described and/or illustrated herein may be implemented in firmware and/or hardware. For example, computing system 710 may be configured as an application specific integrated circuit (ASIC) adapted to implement one or more of the embodiments disclosed herein.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

Although the present disclosure includes several embodiments, the disclosure is not intended to be limited to the specific forms set forth herein. On the contrary, it is intended to cover such alternatives, modifications, and equivalents as can be reasonably included within the scope defined by the appended claims.

What is claimed is:

1. A method, comprising:
   identifying, at an information handling system, a first set and a second set of data segments within a first set and a second set of structured data;
   for each of the data segments within each set of data segments,
      converting the data segment into a normalized data segment that is expressed in a standardized data format,
      applying a hash algorithm to the normalized data segment to produce a data segment hash value, obtaining a standardized identifier for the normalized data segment, and generating a pair corresponding to the data segment, the pair including a first value and a second value, wherein the first value includes the standardized identifier and the second value includes the data segment hash value;

using the standardized identifier for each normalized data segment to sort each pair corresponding to each data segment within each set of data segments into a standardized order;

assembling an aggregate hash code for each set of data segments to produce a first and a second aggregate hash code, each aggregate hash code comprising each pair sorted according to the standardized order for each of the normalized data segments in the corresponding first or second set of data segments;

comparing corresponding data segment hash values within the first and second aggregate hash codes to determine a similarity coefficient between the first set and the second set of structured data; and conveying the similarity coefficient to a storage location at the information handling system or to an application, module, service, or system requesting the similarity coefficient.

2. The method of claim 1, further comprising receiving the set of structured data at the information handling system.

3. The method of claim 1, wherein converting the data segment comprises removing one or more extraneous spaces from the data segment.

4. An information handling system, comprising:

one or more processors;

a non-transitory computer-readable storage medium coupled to the one or more processors; and a plurality of instructions, encoded in the computer-readable storage medium and configured to cause the one or more processors to identify a first set and a second set of data segments within a first set and a second set of structured data, for each of the data segments within each set of data segments, converting the data segment into a normalized data segment that is expressed in a standardized data format, apply a hash algorithm to the normalized data segment to produce a data segment hash value, obtain a standardized identifier for the normalized data segment, and generate a pair corresponding to the data segment, the pair including a first value and a second value, wherein the first value includes the standardized identifier and the second value includes the data segment hash value, use the standardized identifier for each normalized data segment to sort each pair corresponding to each data segment within each set of data segments in a standardized order, assemble an aggregate hash code for each set of data segments to produce a first and a second aggregate hash code, each aggregate hash code comprising each pair sorted according to the standardized order for each of the normalized data segments in the corresponding first or second set of data segments, compare corresponding data segment hash values within the first and second aggregate hash codes to determine a similarity coefficient between the first set and the second set of structured data; and convey the similarity coefficient to a storage location at the information handling system or to an application, module, service, or system requesting the similarity coefficient.

5. The information handling system of claim 4, wherein the plurality of instructions is further configured to cause the one or more processors to receive the set of structured data at the information handling system.

6. The apparatus of claim 4, wherein the plurality of instructions is further configured to remove one or more extraneous line breaks from the data segment, as a part of converting the data segment.

7. A non-transitory computer readable storage medium having program instructions encoded therein, wherein the program instructions are executable to:

identify, at an information handling system, a first set and a second set of data segments within a first set and a second set of structured data;

for each of the data segments within each set of data segments, convert the data segment into a normalized data segment that is expressed in a standardized data format, apply a hash algorithm to the normalized data segment to produce a data segment hash value, obtain a standardized identifier for the normalized data segment, and generate a pair corresponding to the data segment, the pair including a first value and a second value, wherein the first value includes the standardized identifier and the second value includes the data segment hash value;

use the standardized identifier for each normalized data segment to sort each pair corresponding to each data segment within each set of data segments in a standardized order;

assemble an aggregate hash code for each set of data segments to produce a first and a second aggregate hash code, each aggregate hash code comprising each pair sorted according to the standardized order for each of the normalized data segments in the corresponding first or second set of data segments;

compare corresponding data segment hash values within the first and second aggregate hash codes to determine a similarity coefficient between the first set and the second set of structured data; and convey the similarity coefficient to a storage location at the information handling system or to an application, module, service, or system requesting the similarity coefficient.

8. The non-transitory computer readable storage medium of claim 7, wherein the program instructions are further executable to receive the set of structured data at the information handling system.

9. The non-transitory computer readable storage medium of claim 7, wherein the aggregate hash code includes a header.

10. The non-transitory computer readable storage medium of claim 9, wherein the header includes information regarding an application program configured to use the aggregate hash code.

11. The non-transitory computer readable storage medium of claim 9, wherein the header includes information regarding a source or a destination of the set of structured data.

* * * * *